United States Patent
Prasad et al.

(10) Patent No.: US 10,429,858 B2
(45) Date of Patent: Oct. 1, 2019

(54) ADVISORY CONTROLS OF DESALTER SYSTEM

(71) Applicant: BL Technologies, Inc., Minnetonka, MN (US)

(72) Inventors: Vijaysai Prasad, Bangalore (IN); Jayaprakash Sandhala Radhakrishnan, Bangalore (IN); Jeffrey Allen Zurlo, The Woodlands, TX (US); Richard Stephen Hutte, Boulder, CO (US); Arjun Bhattacharyya, Bangalore (IN); Manish Joshi, Bangalore (IN)

(73) Assignee: BL Technologies, Inc., Minnetonka, MN (US)

( * ) Notice: Subject to any disclaimer, the term of this patent is extended or adjusted under 35 U.S.C. 154(b) by 591 days.

(21) Appl. No.: 14/835,161

(22) Filed: Aug. 25, 2015

(65) Prior Publication Data

US 2015/0361350 A1 Dec. 17, 2015

Related U.S. Application Data

(63) Continuation-in-part of application No. 14/242,964, filed on Apr. 2, 2014, now Pat. No. 9,255,228, which
(Continued)

(51) Int. Cl.
*G05D 7/06* (2006.01)
*B01D 17/04* (2006.01)
(Continued)

(52) U.S. Cl.
CPC ....... *G05D 7/0676* (2013.01); *B01D 17/0214* (2013.01); *B01D 17/04* (2013.01);
(Continued)

(58) Field of Classification Search
CPC ........ B01D 17/04; B01D 17/12; C10G 31/08; C10G 2300/88; C10G 33/04; G01F 23/2962
(Continued)

(56) References Cited

U.S. PATENT DOCUMENTS

| 4,551,239 A | 11/1985 | Merchant et al. |
| 4,737,265 A | 4/1988 | Merchant, Jr. et al. |

(Continued)

FOREIGN PATENT DOCUMENTS

| CA | 2730628 | 1/2010 |
| CN | 200963571 | 10/2007 |

(Continued)

OTHER PUBLICATIONS

"Dispersion of Viscous Liquids by Turbulent Flow in a Static Mixer;" Paul D. Berkman; AIChE Journal Apr. a988 vol. 34, No. 4.*

(Continued)

*Primary Examiner* — Shogo Sasaki
(74) *Attorney, Agent, or Firm* — Meunier Carlin & Curfman LLC

(57) ABSTRACT

The present invention concerns a method of providing advisory controls for a desalter system. The method allows a user to continuously monitor performance of the desalter system, to continuously monitor position of the emulsion band (or rag layer), to control the emulsion band using demulsifiers, and to recommend to users how to maintain optimal pressure drop at the mixing device of the desalter system. This is achieved by using a first principles based model combined with a sensor to measure the position, quality and size of the emulsion band. The first principles based model takes into account the geometry of the desalter system, physical properties of the crude oil and water, as well as the operating conditions. Thus, the method provides
(Continued)

users with sensing of an emulsion layer through direct measurements and also gives recommendations on appropriate corrective actions to be initiated during upsets.

22 Claims, 5 Drawing Sheets

Related U.S. Application Data is a continuation of application No. 13/187,819, filed on Jul. 21, 2011, now abandoned.

(51) Int. Cl.
  *B01D 17/12*   (2006.01)
  *C10G 31/08*   (2006.01)
  *C10G 33/04*   (2006.01)
  *C10G 33/08*   (2006.01)
  *G01F 23/296*   (2006.01)
  *B01D 17/02*   (2006.01)

(52) U.S. Cl.
  CPC ............ *B01D 17/12* (2013.01); *C10G 31/08* (2013.01); *C10G 33/04* (2013.01); *C10G 33/08* (2013.01); *G01F 23/2962* (2013.01); *C10G 2300/80* (2013.01)

(58) Field of Classification Search
  USPC ........... 700/266, 270–273; 208/251 R, 262.1
  See application file for complete search history.

(56) References Cited

U.S. PATENT DOCUMENTS

| | | | |
|---|---|---|---|
| 5,302,253 A | 4/1994 | Lessard et al. | |
| 5,326,482 A | 7/1994 | Lessard et al. | |
| 5,493,631 A * | 2/1996 | Huang et al. | 706/23 |
| 5,822,740 A * | 10/1998 | Haissig et al. | 706/3 |
| 6,465,528 B1 | 10/2002 | Holtrup et al. | |
| 6,532,454 B1 * | 3/2003 | Werbos | 706/14 |
| 6,535,795 B1 | 3/2003 | Schroeder et al. | |
| 6,638,983 B1 | 10/2003 | Taylor | |
| 7,244,364 B1 * | 7/2007 | Weber | 210/729 |
| 7,991,577 B2 | 8/2011 | Havener et al. | |
| 8,417,480 B2 | 4/2013 | Havener et al. | |
| 8,983,815 B2 | 3/2015 | Bleackley et al. | |
| 2003/0097243 A1 * | 5/2003 | Mays et al. | 703/2 |
| 2006/0211128 A1 | 9/2006 | Johnson et al. | |
| 2007/0111903 A1 | 5/2007 | Engel et al. | |
| 2008/0091281 A1 | 4/2008 | Colman et al. | |
| 2010/0015720 A1 | 1/2010 | McDaniel et al. | |
| 2010/0089797 A1 * | 4/2010 | Chakka et al. | 208/188 |
| 2010/0108566 A1 | 5/2010 | Scattergood et al. | |
| 2011/0003676 A1 * | 1/2011 | Collier et al. | 494/23 |
| 2012/0024758 A1 * | 2/2012 | Love | 208/187 |
| 2013/0253685 A1 | 9/2013 | Havener et al. | |
| 2014/0039833 A1 | 2/2014 | Sharpe, Jr. et al. | |
| 2014/0090454 A1 | 4/2014 | Surman et al. | |
| 2014/0131254 A1 | 5/2014 | Soliman | |
| 2014/0212978 A1 | 7/2014 | Sharpe, Jr. et al. | |
| 2014/0277619 A1 | 9/2014 | Nixon et al. | |
| 2014/0277620 A1 | 9/2014 | Nixon et al. | |
| 2014/0282195 A1 | 9/2014 | Nixon et al. | |

FOREIGN PATENT DOCUMENTS

| | | |
|---|---|---|
| CN | 201192587 | 2/2009 |
| CN | 102520705 | 6/2012 |
| GB | 786430 | 5/1958 |
| WO | 1997/036178 | 10/1997 |
| WO | 2006/098977 | 9/2006 |
| WO | 2010/008911 | 1/2010 |

OTHER PUBLICATIONS

"Designing and Testing a Chemical Demulsifier Dosage Controller;" Alsheheri etal.; Process Control pp. 973 (2010).*

Al-Otaibi, M.B., et al., "A Computational Intelligence Based Approach for the Analysis and Optimizatoin of a Crude Oil Desalting and Dehydration Process," American Chemical Society Publications, 2005, pp. 2526-2534.

Alshehri, A.K., et al., "Designing and Testing a Chemical Demulsifier Dosage Controller in a Crude Oil Desalting Plant: An Artificial Intelligence-Based Network Approach," Journal on Chemical Engineering & Technology, vol. 33, Issue 6, 2010, pp. 973-982.

Berkman, P.D. et al., "Dispersion of Viscous Liquids by Turbulent Flow in a Static Mixer," AIChE Journal, vol. 34, No. 4, 1988, pp. 602-609.

Folgueras, et al., "Influence of Sewage Sludge Addition on Coal Ash Fusion Temperatures," Energy & Fuels, vol. 19, 2005, pp. 2562-2570.

Jeelani, S.A.K., et al., "Prediction of Steady State Dispersion Height from Batch Settling Data," AIChE Journal, vol. 31, No. 5, 1985, pp. 711-720.

European Search Report, dated Nov. 27, 2012, received in connection with EP Patent Application No. 12177263.6.

* cited by examiner

ADVISORY CONTROLS OF DESALTER SYSTEM

CROSS-REFERENCE TO RELATED APPLICATION

The present application is a continuation in part (CIP) application of U.S. patent application Ser. No. 14/242,964 filed Apr. 2, 2014, now U.S. Pat. No. 9,255,228 issued Feb. 9, 2016, which was a continuation application of U.S. patent application Ser. No. 13/187,819 filed Jul. 21, 2011, now abandoned, both of which are fully incorporated by reference herein.

FIELD OF INVENTION

The present invention pertains to a method of providing advisory controls for a desalter system. More particularly, the method continuously monitors performance of the desalter system, continuously monitors position of the emulsion band, controls the emulsion band using chemicals and provides recommendations for maintaining optimal pressure drop at the mix valve.

BACKGROUND OF THE INVENTION

Desalting is typically the first operation in oil refineries. Crude oil that is processed without desalting is detrimental to the refinery assets, leading to severe corrosion problems. The desalter system removes the majority of salts in the crude oil by injecting water into the system. Because of the higher solubility in water, salts move from the crude oil to the water phase. Thus, desalter systems are typically large gravity settling tanks that provide enough residence time for both the water and the crude oil to settle. Usually density of water is higher than that of oil; hence, water settles at the bottom of the desalter system, and crude oil leaves the unit from the top. Further, the addition of an electrical grid at the top of desalter systems can promote the separation of crude oil at the top and the water to settle at the bottom. Desalting can also involve chemical treatment of the crude oil and/or the water to facilitate removal of the salt.

In ideal operation, the crude oil and water should have a very thin interface. However, in practice, during the operation, an emulsion of water in crude oil is formed as a distinct layer between the water and crude oil. This emulsion band is also called a rag layer, and can be quite dynamic in position and size. Typically, these emulsion bands can cause oil refiners to run less than optimum wash water rates and less than optimum extent of shearing to facilitate oil and water mixing through a mixing device, which reduces its efficiency for salt and sediment removal. Excessive growth of these emulsion bands can shorten the operational lifespan of the electrical grids in the desalter system, thus bringing the entire refinery operations to a halt. Accordingly, it is not only important to monitor and control the performance of the desalter system, but it is also desirous to keep the position and size of the emulsion band under control.

Performance of a desalter can be characterized based on three parameters: percentage salt removal in desalted crude oil relative to that of feed, percentage water removal in desalted crude oil relative to that of feed, and percentage oil carry over in brine or desalter water exit stream. Optimal operation of the desalter means very high values of salt and water removal and close to zero value for oil carryover in water.

Furthermore, operation of the desalter system is difficult and requires an expert with vast experience to make the right corrective decision. The crude oil blend in refineries changes frequently, and when the refineries process a new blend, the operators need to be able to judge performance of the desalter system without direct visibility of the emulsion band (rag layer), to determine effectiveness of the chemical treatment, and to initiate appropriate corrective actions during upset conditions.

Thus, there exists a strong need for a method of providing advisory controls for a desalter system, which continuously monitors performance of the desalter system, continuously monitors position of the emulsion band, controls the emulsion band and provides recommendations for maintaining optimal amount of mixing of the oil and water.

SUMMARY OF THE INVENTION

In one exemplary embodiment of the invention, a method of providing advisory controls for a desalter system is disclosed. The method allows a user to continuously monitor performance of the desalter system, to continuously monitor position of the emulsion band (or rag layer), to control the emulsion band using demulsifiers, and to recommend to users how to maintain optimal pressure drop at the mixing device, such as a mix valve or other appropriately designed device. In another embodiment, this is achieved by using a first principles based model combined with a device able to measure the position, quality (i.e., continuous phase) and thickness of the emulsion band. The first principles based model takes into account the geometry of the desalter system, physical properties of the crude oil and water, as well as the operating conditions.

Once the sensor measures the emulsion band, a Model Predictive Controls is utilized to dose the chemicals so that the sensed emulsion band is under control. Advisory solutions are then provided to users on the effect of changing the mixing device pressure drop based on the performance of the desalter system. Recommendations are also provided to the users based on the effect variation in wash water flow rate and based on performance of the desalter system. Thus, the method provides users with sensing of an emulsion layer through direct measurements and also gives recommendations on appropriate corrective actions to be initiated during upsets.

In one aspect, chemicals are used to control the emulsion band. A phase type of the emulsion is determined, wherein the chemicals used to control the emulsion band and a dosing rate of the chemicals depends upon the phase type of the emulsion. For example, if the phase type of the emulsion is an oil continuous emulsion, then the chemicals include one or more of a primary emulsion breaker, a solids wetting agent, an asphaltene stabilizer, a pH adjusting agent, and combinations thereof. In another example, if the phase type of the emulsion is a water continuous emulsion, then the chemicals include one or more of a reverse emulsion breaker, a pH adjusting agent, and combinations thereof.

Another method disclosed herein comprises a method of controlling operations of a desalter system. The method comprises feeding crude oil and wash water to a desalter through a mixing device to form an emulsion, wherein a change in pressure (delta P) occurs across the mixing device. The emulsion is fed to a desalter. In the desalter, the emulsion forms an oil phase, a water phase, and an emulsion band layer providing an interface between the oil phase and said water phase. The position, size and quality of the emulsion band layer is continuously monitored. Such continuous monitoring includes measuring a thickness of the emulsion band layer by a sensor. The sensor can be, for example, a conductance sensor, a microwave absorption sensor, a density sensor, an ultrasound sensor, a resonant LCR sensor, and the like. The sensor is located either directly inside of the desalter vessel in a segmented configuration or is in-line with the existing sampling system of either tri-lines or a swing arm of the desalter system. Model predictive controls can be provided for the desalter system. The model predictive controls comprise data correlating the measured thickness of the emulsion band layer to a corrective chemical dosing rate and to a corrective delta P across the mixing device. Chemicals can be fed to the desalter at a chemical dosing rate to result in the emulsion band layer having a desired thickness. Advisory information can be provided to control delta P to control the quality and thickness of the emulsion band.

The method of controlling operations of a desalter system may further comprise feeding the crude oil and the wash water to the desalter at the corrective delta P and/or feeding the chemicals to the desalter at the corrective dosing rate. In one aspect, the chemicals can comprise demulsifiers. The demulsifiers can comprise oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters, polyoxyalkylene glycols, and the like.

The present invention and its advantages over the prior art will become apparent upon reading the following detailed description and the appended claims with reference to the accompanying drawings.

BRIEF DESCRIPTION OF THE DRAWINGS

These and other aspects of the invention will be understood from the description and claims herein, taken together with the drawings showing details of construction and illustrative embodiments, wherein:

DETAILED DESCRIPTION

Approximating language, as used herein throughout the specification and claims, may be applied to modify any quantitative representation that could permissibly vary without resulting in a change in the basic function to which it is related. Accordingly, a value modified by a term or terms, such as "about", is not limited to the precise value specified. In at least some instances, the approximating language may correspond to the precision of an instrument for measuring the value. Range limitations may be combined and/or interchanged, and such ranges are identified and include all the sub-ranges stated herein unless context or language indicates otherwise. Other than in the operating examples or where otherwise indicated, all numbers or expressions referring to quantities of ingredients, reaction conditions and the like, used in the specification and the claims, are to be understood as modified in all instances by the term "about".

"Optional" or "optionally" means that the subsequently described event or circumstance may or may not occur, or that the subsequently identified material may or may not be present, and that the description includes instances where the event or circumstance occurs or where the material is present, and instances where the event or circumstance does not occur or the material is not present.

As used herein, the terms "comprises", "comprising", "includes", "including", "has", "having", or any other variation thereof, are intended to cover a non-exclusive inclusion. For example, a process, method, article or apparatus that comprises a list of elements is not necessarily limited to only those elements, but may include other elements not expressly listed or inherent to such process, method, article, or apparatus.

The singular forms "a", "an", and "the" include plural referents unless the context clearly dictates otherwise.

Figure 1:
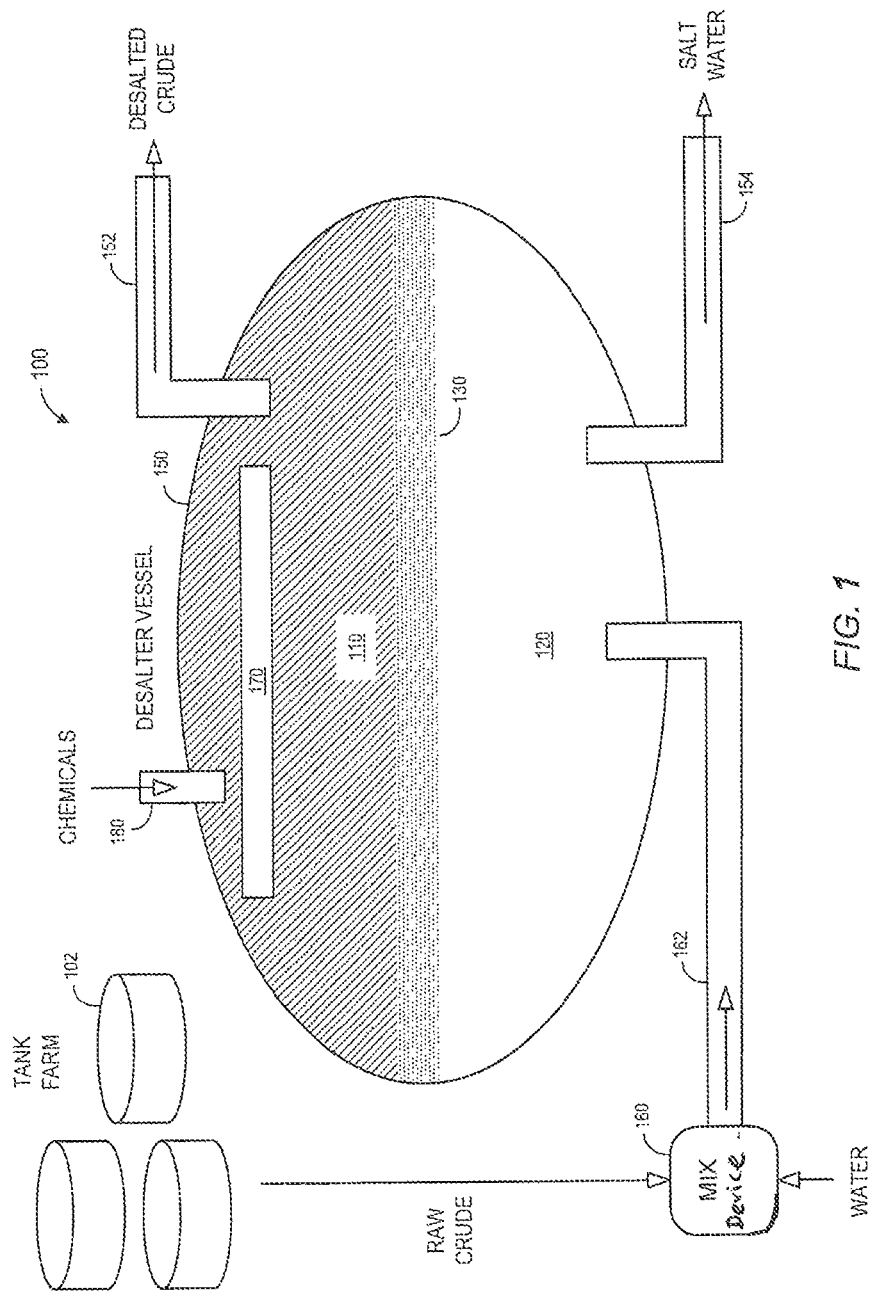
FIG. 1 is a block schematic diagram of a desalter system in accordance with some embodiments.

FIG. 1 is a block schematic diagram of a desalter system 100 in accordance with some embodiments. The system includes a desalter vessel 150 that receives a combination of raw crude oil (e.g., from a tank farm 102) and water from a mix device 160 such as a mix valve via an input pipe 162. The desalter vessel 150 provides desalted crude oil via a first output pipe 152 and salt water or brine via a second output pipe 154. A chemical input pipe 180 and/or an electrified grid 170 may facilitate separation within the desalter vessel 150 of an oil region 110 and a water region 120 that interface at a rag layer 130. The geometry of the vessel 150 and associated pipes 162, 152, 154, 180, the chemicals injected into the vessel, the power applied to the electrified grid may all impact operation of the system.

Moreover, variation in crude oil composition and properties may cause operational issues with the system 100, which in turn may impact downstream operation and reliability of a refinery. Note that many different factors, both physical and chemical, may interact to govern the desalter vessel 150 behavior in the presence of crude variations. These factors, and their interaction, are complex and may result in a limited ability to achieve robust and consistent operation of the system. Typically, a desalter vessel 150 is one of the least instrumented and automated units in a refinery. Experienced operators manually make operational decisions based on limited information and limited knowledge of the overall desalter operation. Embodiments described herein may facilitate an automatic generation of appropriate advisory data to improve performance of the desalter system 100.

Figure 2:
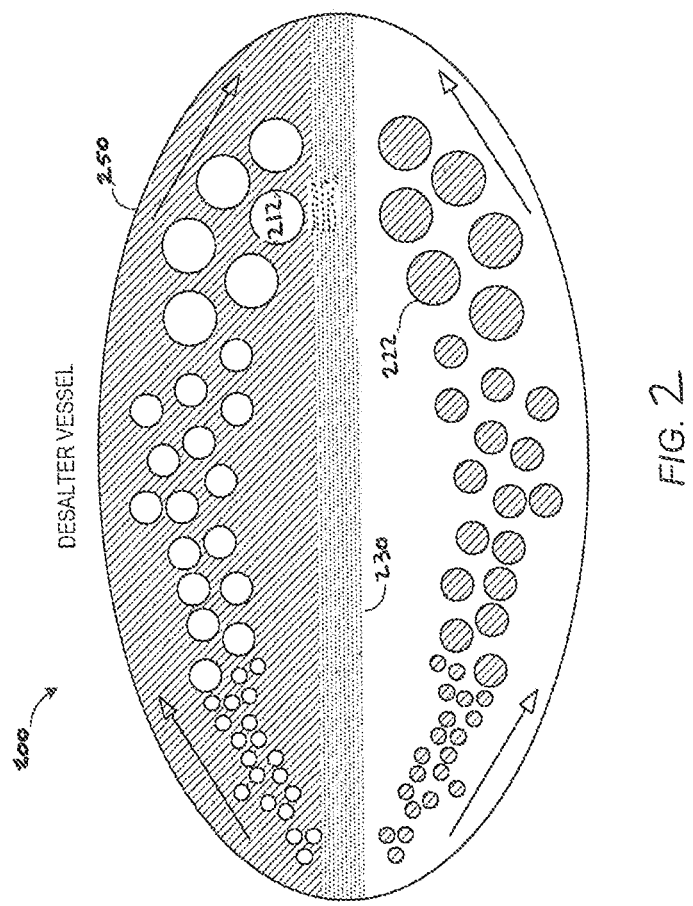
FIG. 2 illustrates the inner operation of a desalter vessel in accordance with some embodiments.

FIG. 2 illustrates the inner operation of a desalter vessel 200 in accordance with some embodiments. The desalter vessel 200 includes an oil region having some water droplets 212 (shown white in FIG. 2) and a water region having some oil droplets 222 (shown crosshatched in FIG. 2). Note that the average size of the droplets 212, 222 might increase over time, causing them to migrate (fall or rise) to the rag layer 230. Some inputs associated with the operation of the desalter vessel 200 include desalter design geometry and configuration, oil-water mixture in feed (% water), in/out flow rates—residence times, water droplet size distribution in feed and desalter, coalescence of droplets (both general and electro), hydrodynamics—internal oil/water flows, phase inversion, and/or solids settling (reduced residence time). Additional inputs/factors may include emulsion (rag)

formation and stability, impact on separation, the effect of crude properties, the effect of water properties, and/or the effect of chemicals. Some outputs associated with the operation of the desalter vessel 200 include amount oil in brine, water, salt and solids in desalted oil, oil/water profile along desalter height, rag layer location and thickness, and/or transient dynamics—residence time.

Figure 4:
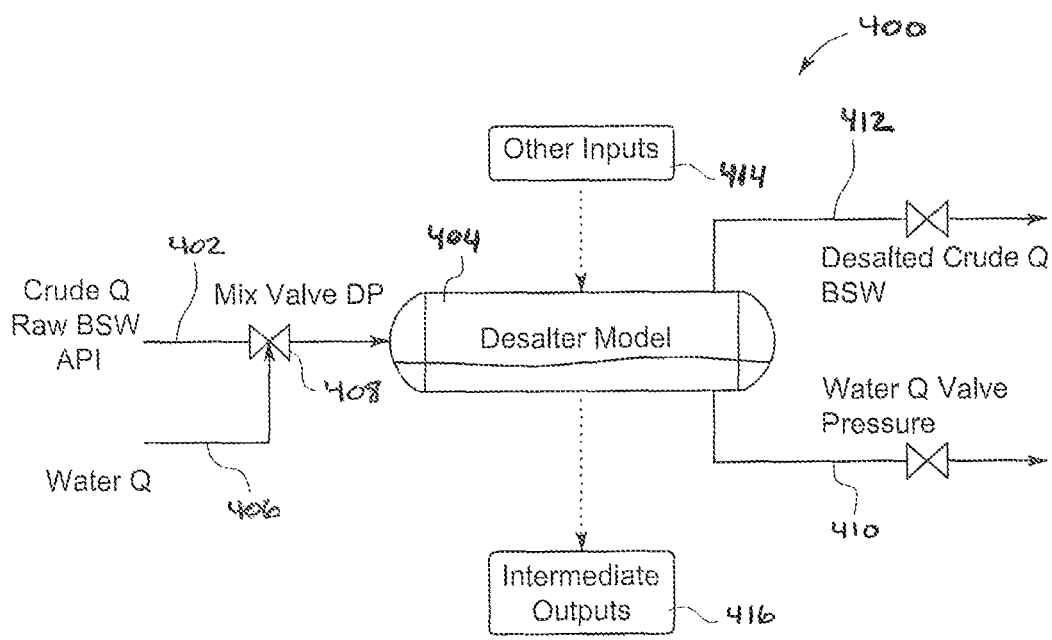
FIG. 4 is a schematic process diagram showing the desalter model framework of the present invention.

Disclosed is an improved method of providing advisory controls for a desalter system such as that shown in FIGS. 1 and 2. The method allows a user to continuously monitor performance of the desalter system, to continuously monitor position and quality of the emulsion band (or rag layer), to control the emulsion band using demulsifiers, and to recommend to users how to maintain optimal mixing device delta pressure (delta P) drop. In one embodiment, this is achieved by using a first principles based model combined with one or more sensors able to measure the position, quality and size of the emulsion band. As shown in FIGS. 1, 2 and 4, the emulsion band forms between the oil phase and the water phase. Because of the densities of water and oil, water will settle toward the bottom of the desalter, the emulsion band will be on top of the water, and oil will be on top of the emulsion band. The position of the emulsion band can generally be thought of as the height where the emulsion band starts from the bottom of the desalter vessel. In other words, it is also the height that the water occupies as measured from the bottom of the desalter. By knowing the dimensions of the desalter vessel, the volume of water in the desalter vessel can be determined by knowing the position of the emulsion band. The size of the emulsion band is generally its vertical thickness (i.e., the distance between the water phase and the oil phase that is occupied by the emulsion band). Thickness of the emulsion band is the distance in height from the top of the emulsion band to the bottom of the emulsion band. By knowing the dimensions of the desalter vessel and the thickness of the emulsion band, the volume of water and the volume of the emulsion band can be determined. If there is no head space in the desalter, then the volume of oil can also be determined. If there is head space, then the height of the oil or the volume of the head space would need to be known to determine the volume of the oil in the desalter. When referring to the quality of the emulsion band, this is generally a reference to a composition or continuous phase of the emulsion band (e.g., water in oil, oil in water). In some instances, "phase type" may be used rather than quality when referring to the emulsion band.

Referring back to detecting the size position or quality of the emulsion band with one or more sensors, the one or more sensors can be, for example a conductance sensor (as available from, for example, AMTEK Drexelbrook, Horsham, Pa.), a microwave absorption sensor (as available from, for example, Agar Corporation, Grand Cayman, BWI), where multiple probes are used to detect percentage water—typically two to three probes in the desalter vessel, a (nuclear) density sensor (as available from, for example, Tracerco (Pasadena, Tex.), VEGA Americas, Inc., (Cincinnati, Ohio), an ultrasound sensor, an inductor-capacitor-resistor structure (LCR) resonant transducer and the application of multivariate data analysis applied to the signals from the transducer. The resonant sensor system can also provide the ability to determine the composition of water and oil mixtures, oil and water mixtures, and the emulsion layer (see, for example, U.S. Patent Pre-Grant Publication US 20140090454 (fully incorporated by reference and made a part hereof), and the like. The one or more sensors are located either directly inside of the vessel in a segmented configuration or is in-line with the existing sampling system of either tri-lines or a swing arm of the desalter. The first principles based model takes into account the geometry of the desalter system, and physical properties of the crude oil and water, as well as the operating conditions.

The method of providing advisory controls for a desalter system utilizes the process model and the actual constraints that arise while controlling the desalter system. Typically, there are three manipulated variables that control the desalter system. The variables include one or more chemical dosing pumps that controls the release of chemicals, such as demulsifiers or other chemicals to control the emulsion band. The mixing device delta pressure drop that controls the quality of the emulsion formed depending on the amount of shear imparted to provide intimate oil and water mixing. And, the wash water rate that controls the performance of the desalter system. (See FIG. 3).

The proposed method can also utilize online measurements of performance parameters; if available, these include percentage extractable salt and water removal in desalted crude and oil carry over in desalter brine; these measurements can be used to estimate or fine tune model parameters of the controller. (See FIG. 3).

In one embodiment, based on above variables, the method of providing advisory controls for a desalter system utilizes a Model Predictive Control to automatically dose the chemicals such that the sensed emulsion band is under control. Advisory solutions are then provided to users on the effect of changing the mixing device delta pressure drop based on the performance of the desalter system. Recommendations are also provided to the users based on the effect of variation in wash water flow rate which is based on performance of the desalter system.

In operation, the desalter system is difficult to operate and requires an expert with vast experience to make the right corrective decision. For example, the crude blend in oil refineries changes frequently. Thus, when refineries process a new blend, operators must recalculate and adjust chemical dosage, mix valve pressure drop and wash water rates of the desalter system. However, monitoring performance can be difficult as users do not have direct visibility of the desalter system, they also do not know the effectiveness of the chemical treatment or the appropriate corrective actions to be initiated during upset conditions. The proposed method addresses these concerns and allows users to have sensing of the emulsion layer through direct measurement and also gives recommendations on appropriate corrective actions to be initiated during upsets.

Upset conditions cause the emulsion band to grow, so operators need to monitor position of the emulsion band. Operators want the emulsion band to be as small and as thin as possible. Monitoring of the emulsion band can thus be done via sensing of the emulsion band through direct measurement, facilitated by any of a number of appropriate devices that can detect the position, quality, and thickness of the emulsion band.

Furthermore, chemical treatment, or the addition of demulsifiers and/or other chemicals to aid in improving the operating performance of a desalter is a difficult task if done without obtaining feedback on the performance of the desalter system. As example, excessive addition of the demulsifiers tends to stabilize the emulsion, but may cause severe performance issues with the desalter system. Subsequently, underdoses are generally ineffective in breaking the emulsions. Thus, it is desired to add the demulsifiers until the point of inflection is reached. The point of inflection is determined when maximum entitlement has been reached. Specifically, the addition of chemicals improves performance to a certain point. Once this point is reached, then performance will decrease with the addition of chemicals. This maximum entitlement point is the point of inflection.

Typical demulsifiers used in the chemical treatment of the emulsion band include, but are not limited to, water soluble organic salts, sulfonated glycerides, sulfonated oils, acetylated caster oils, ethoxylated phenol formaldehyde resins, polyols, polyalkylene oxides, ethoxylated amines, a variety of polyester materials, and many other commercially available compounds. Specifically, the demulsifiers can comprise oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters and polyoxyalkylene glycols. This enumeration is, of course, not exhaustive and other demulsifying agents or mixtures thereof can be used as is known to one skilled in the art.

Chemical dosing and the chemical dosing rate may be adjusted according to the phase type of the emulsion. For example, if the phase type of the emulsion is an oil continuous emulsion (also referred to as a water-in-oil emulsion), chemical dosing may comprise the addition of a primary emulsion breaker, a solids wetting agent, an asphaltene stabilizer, a pH adjusting agent, and combinations thereof. Exemplary dosing rates can be 1-1000 ppm for the primary emulsion breaker, 1-1000 ppm for the solids wetting agent, 1-1000 ppm for the asphaltene stabilizer, and 1-10,000 ppm pH adjusting agent.

If the emulsion phase type is water continuous emulsion (also referred to as oil-in-water emulsion), chemical dosing may comprise a reverse emulsion breaker (at a dosing rate of 1-1000 ppm), a solids wetting agent (dosing rate of 1-1000 ppm), a pH adjusting agent (dosing rate of 1-10,000 ppm), and combinations thereof.

If the emulsion phase type is mixed (i.e., multiple emulsions), the chemical dosing may be all of above, individually or combinations thereof.

Examples of primary emulsion breakers can include oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters, polyoxyalkylene glycols. Examples of pH adjusting agents can include base pH adjusters comprising hydroxide bases of Group 1A and IIA metals such as sodium or potassium hydroxide, organic hydroxides such as choline hydroxide, tetra alkyl ammonium hydroxide. Examples of pH adjusters may include an organic acid, mineral acid, or a carboxylic acid. Examples of suitable acids include, citric acid, propane-1,2,3-tricarboxylic acid, glycolic acid, glyoxalic acid, formic acid, acetic acid, propanoic acid, butanoic acid, pentanoic acid, oxalic acid, glutaric acid, succinic acid, malonic acid, ascorbic acid, lactic acid, methane sulfonic acid, dodecylbenzenesulfonic acid, naphthalene sulfonic acid, and p-toluene sulfonic acid. Citric acid has the added advantage in that is also a metal complexing agent, and may reduce the amount of metals in the stream being treated. pH reducing agents may be combined with corrosion inhibitors to minimize potential corrosion due to reduction in pH. Some examples of corrosion inhibiting chemicals are hydroxyethyl imidazolines, aminoethyl imidazolines, amidoethyl imidazolines, polymer of polyamine and alkyne diols, and ammonium salt of maleated fatty acids esters with alkylene glycols. Examples of solids wetting agents can include dodecylbenzenesulfonic acid, naphthalene sulfonic acid, p-toluene sulfonic acid, and their amine or ammonia neutralized salts; sodium dioctyl sulfosuccinate, sodium dodecylbenzene sulfonate; oxyalkylated amines, and oxyalkylated polyols. Examples of reverse emulsion breakers can include aluminum chlorohydrate, aluminum sulfate, ferric chloride, ferric sulfate, poly aluminum chloride, poly diallyldimethyl ammonium chloride, polymer of tannin and 2-(methacryloyloxy) ethyltrimethylammonium chloride, polymer of tannin-amine-formaldehyde, polymer of tannin and acryloyloxy ethyltrimethylammonium chloride. Examples of asphaltene stabilizers can include alkylphenol formaldehyde resins, alkylphenol-amine-formaldehyde resins, polyalklylene succinic anhydride derived ester, alkali metal salts of alkylphenol sulfide, alkali metal salts of alkyl phosphate phenate sulfide, polyalkylene succinimide and polyalkylene thiophosphonic acid ester.

Furthermore, the operator advisory system recommends to operators how to maintain optimal mixing device delta P drop. Based on feedback options such as emulsion layer position, crude oil properties and wash water rate, the effect of delta P on performance is determined and recommendations are provided to the operator. Further, depending on the maximum entitlement, operators can make decisions to impact mixing device delta P drop as well.

Figure 3:
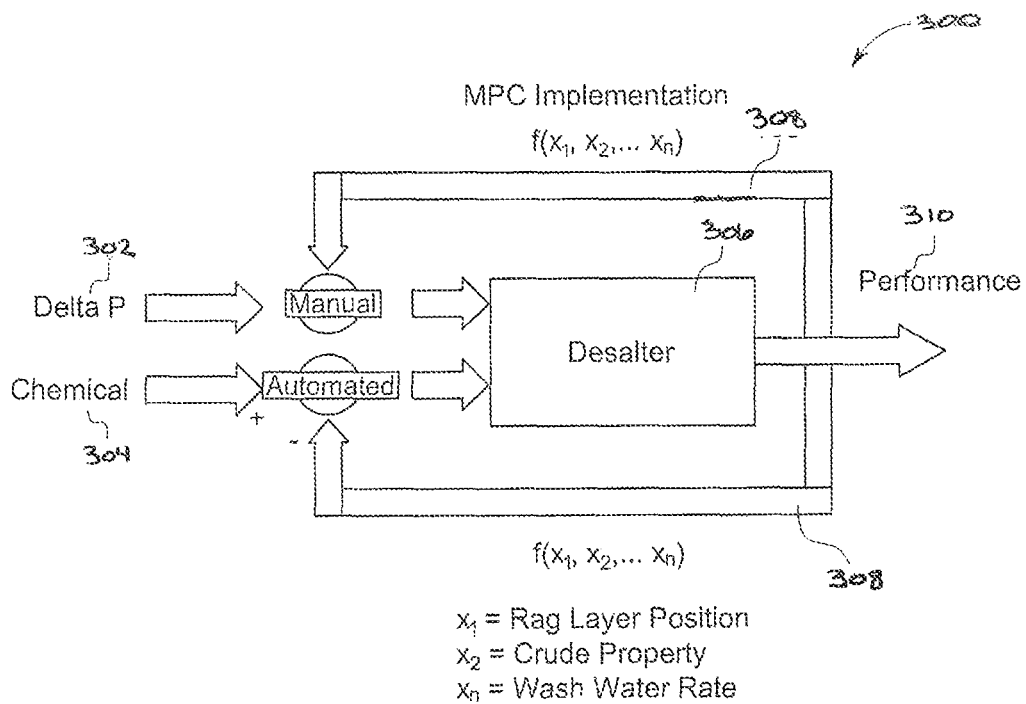
FIG. 3 is a schematic process diagram showing one embodiment of the invention.

As shown in FIG. 3, Model Predictive Controls (MPC) implementation of the desalter system 300 comprises a dynamic desalter model, the model is built using the physics of the desalter and establishes an explicit transfer function between the chemical addition and performance, and delta P and performance. Generally, the MPCs utilize one or more controllers and/or processors in modeling the dynamic desalter model and controlling the desalter system. Specifically, the MPC can allow for manual control of the delta P 302 and automated control of chemical dosing 304 directly in the desalter device 306. The delta P 302 and chemical dosing 304 are continuously monitored, providing feedback 308 to a control room (not shown) for the operators. The feedback options include emulsion layer position, crude oil properties and wash water rate, and the MPC implementation utilizes the feedback options to develop a dynamic desalter model 300. Specifically, the MPC implementation 300 establishes explicit transfer functions between the chemical addition 304 and performance 310, and the delta P 302 and performance 310, wherein $f(x_1, x_2, \ldots x_n)$, with $x_1$=emulsion layer position, $x_2$=crude oil properties, $x_n$=wash water rate and optionally, $x_3$=salt removal from crude, $x_4$=water removal from crude, $x_5$=oil carryover in brine, and the like.

As shown in FIG. 4, a desalter model framework 400 comprises an input of crude oil 402, which is continuously flowing into the desalter model 404. Water 406 is then injected into the desalter model 404, and is controlled by the mix valve delta P 408. The water 406 mixes with the crude oil 402 in the desalter model 404, and because of the higher solubility in water, salts move from the crude oil to the water phase. The desalter model 404 then provides enough residence time for both the water and the crude oil to settle. Due to the density differences, water settles at the bottom of the desalter model 404 and exits via a valve on the bottom 410, and desalted crude oil leaves the desalter model 404 from the top 412.

Further, other inputs 414, such as dimensions of the desalter model, atmospheric pressure, physical properties of the desalter model, the efficiency limit of the electric field and chemical dosage, are used to develop the dynamic desalter model. From these additional inputs 414, the desalter model 404 creates intermediate outputs 416, such as drop size distribution, and emulsion layer height and thickness. The drop size distribution is dependent on the delta P 408, wherein if the mix valve delta P 408 creates low pressure, drop size is smaller and salt removal efficiency is high, but settling of the water is slower. Whereas, if the mix valve delta P 408 creates high pressure, drop size is larger and settling of the water is faster, but salt removal efficiency is low. These additional outputs 416 are used to develop a dynamic desalter model for use with the Model Predictive Controls. For example, the Model Predictive Controls disclose the following formula used to determine automatic online control of chemical dosing and advisory control of delta P:

$$\begin{bmatrix} \eta_1 \\ \eta_2 \\ \vdots \\ \eta_n \end{bmatrix} = \begin{bmatrix} f_{11}(x_1 \ldots x_n) & f_{12}(x_1 \ldots x_n) \\ f_{21}(x_1 \ldots x_n) & f_{22}(x_1 \ldots x_n) \\ \vdots & \vdots \\ f_{n1}(x_1 \ldots x_n) & f_{n2}(x_1 \ldots x_n) \end{bmatrix} \begin{bmatrix} \text{Chemical Conc.} \\ \Delta P_{mix\,valve} \end{bmatrix}$$

Where:
$\eta \rightarrow$ Performance Parameters (emulsion layer, salt concentration, etc.)
$x_i \rightarrow$ Measurements (temperature, density, viscosity, etc.)

Measurements, $x_i$, which are inputs to the MPC, can include, for example, emulsion layer properties such as emulsion layer position and size which can include the height of the emulsion layer within the desalter, the thickness (depth) of the emulsion layer, and the like. Additional inputs to the MPC can include, for example, properties of the crude oil in the system including volumetric flow rate, basic sediment and water (BSW), American Petroleum Institute (API) gravity, combinations thereof, and the like. Current operating parameters can also be inputs, such as current wash water flow rate, current feed crude oil flow rate, percent salt, and the like. These operating parameters are performance characteristics of the desalter system and can further include, for example, percentage of salt removed from the crude oil, percentage of water removed from the crude oil, and the percentage oil carry over in a brine, wherein the percentage of salt removed from the crude oil is determined by comparing the amount of salt present in the desalted crude oil leaving the desalter relative to the amount of salt present in the feed crude oil; the percentage of water removed from the crude oil can be determined by comparing the amount of water present in the desalted crude oil leaving the desalter relative to the amount of water present in said feed crude oil; and the percentage oil carry over in the brine can be determined by the crude oil content in the water stream exiting the desalter.

The MPC can receive a single input or a plurality of inputs simultaneously. Inputs to the MPC can include performance characteristics and can be used by the dynamic desalter model to generate outputs. The inputs to the MPC are used to generate outputs, or performance parameters. Outputs can include, for example, a recommended dosage of at least one demulsifying chemical, a mixing device delta P recommendation, a wash water flow rate recommendation, and the like.

Figure 5:
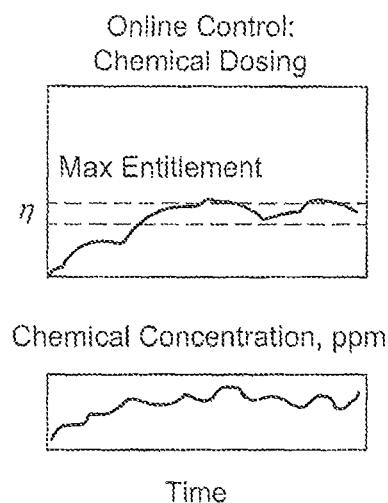
FIG. 5 is a graph depicting the dynamic effect of chemical dosage of the present invention.

The proposed structure can automate performance through chemical dosing and provide recommendations to the operator on effect of delta P on performance. FIG. 5 depicts a graph showing online control of chemical dosing. The dashed lines represent the maximum efficiency of the chemical concentration. The MPC is able to establish explicit transfer functions between chemical addition and performance.

Figure 6:
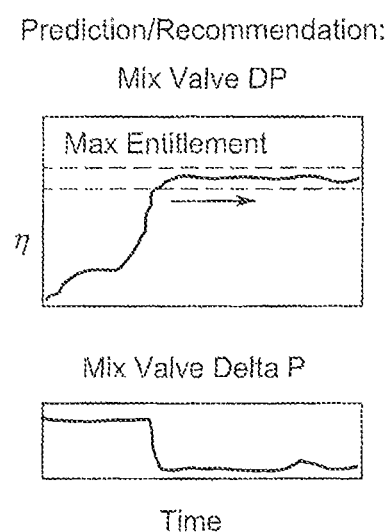
FIG. 6 is a graph depicting the dynamic effect of mix valve delta P (pressure) of the present invention.

FIG. 6 depicts a graph showing predictions/recommendations for manually controlling the mix valve delta P. The dashed lines represent the maximum efficiency of mix valve delta P. The MPC is able to establish explicit transfer functions between delta P and performance.

Figure 7:
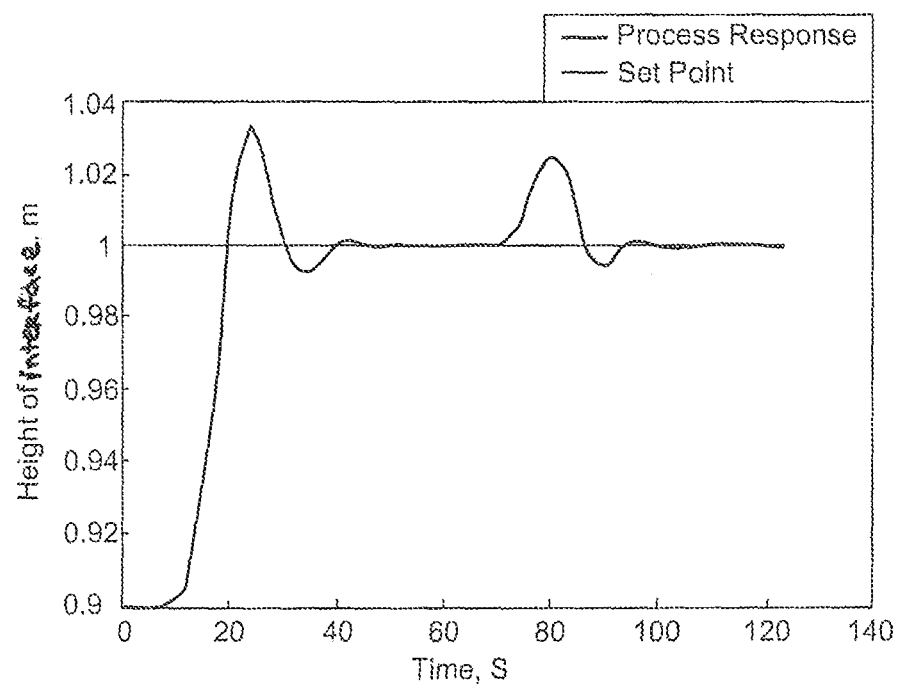
FIG. 7 is a graph depicting a step change in wash water rate of the present invention.

FIG. 7 depicts a graph showing a step change in the wash water rate. Typically, the wash water rate is at 5%; however, at around 60 seconds, a step change occurred and the wash water was adjusted accordingly.

In operation, the desalter model is created using the physics of the desalter system. The desalter model is used in the Model Predictive Controls to automate performance through chemical dosing and to give recommendations to the operator on effect of delta P on performance. To determine the desalter model, an overall material balance is calculated:

The rate of change of rag layer thickness (dh/dt) can be calculated using mass balance for the desalter system. Rate of change of rag layer mass=Mass of Fluids In−Mass of Fluids Out. In addition, Bernoulli's principle equation is used to relate the pressure head and the velocity heads of the fluids inside the desalter.

Further, the emulsion band thickness can be calculated for a specific crude oil—water mixture from batch settling experiments using correlation available in the literature. (See S. A. K. Jeelani and Stanley Hartland, *Prediction of Steady State Dispersion Height from Batch Settling Data, AIChE Journal*, 31(5), 711, (1985)).

Then, water and crude oil volumes are calculated in the desalter, using the desalter's actual shape (including the dished end portions) and the position of the rag layer. The volumes are expressed as a function of the height of the rag layer.

The size distribution of the water droplets at the desalter entrance is a function of various parameters including the crude oil and water flow rates, fluid properties (viscosity, density, and surface tension), temperature, pressure drop at the mix valve, dimensions of the mix valve. The Sauter mean diameter of the water droplets is calculated using these parameters.

The overall drop size distribution of water droplets is determined from the Sauter mean diameter using multiple correlations. (See Paul D. Berkman and Richard V. Calabrese, *Dispersion of Viscous Liquids by Turbulent Flow in a Static Mixer, AIChE Journal*, 34(4), 602, (1988)).

The terminal settling velocity of the water droplets in the oil phase is calculated using Stokes law. It takes into account the diameter of the particles, viscosity of the continuous phase and the difference in densities between the two phases. The volume fraction of the dispersed phase (water) is used to calculate the hindered settling velocity of the water drops.

In a desalter, both the demulsifier chemicals and the electrical field generated by the grid perform one function—to reduce the repulsive forces between the water droplets, agglomerate them, leading to coalescence and increase in size of the drops. The quantitative effect of the chemical dosage and electrical field on the droplet size is added in the form of empirical correlations. These effects are incorporated in the form of a 'size increase factor'.

The individual residence times of the water phase and the oil phases in the desalter are calculated using the respective flow rates and the volumes occupied by each phase in the desalter. Based on the residence time of the phases and the settling velocity of the drops, a 'Critical Drop Diameter' is calculated. This is the smallest drop size that can settle into the water phase within the available residence time. Drops smaller than this critical size, do not settle and are carried over in the oil stream. Based on the fraction, the water-separation efficiency of the desalter is calculated.

Finally, the electrical grid, and the effect of the mix valve delta P performance and chemical selection and dosage is determined Based on these model steps, model results are calculated to determine predicted drop size distribution, predicted emulsion band thickness, predictive demulsifier dosage, etc. These predictions can then be used to create the desalter model. The desalter model is then used in the Model Predictive Controls to automate performance through automatic, online chemical dosing and to give recommendations to the operator on the effect of delta P on performance.

Therefore, a method of controlling operations of a desalter system is disclosed. The method comprises feeding crude oil and wash water to a desalter through a mixing device to form an emulsion, wherein a change in pressure (delta P) occurs across the mixing device. The emulsion is fed to a desalter. In the desalter, the emulsion forms an oil phase, a water phase, and an emulsion band layer providing an interface between the oil phase and said water phase. The position and size of the emulsion band layer is continuously monitored. Such continuous monitoring includes measuring thickness, height and quality of the emulsion band layer by a sensor. The sensor can be, for example, a conductance sensor, a microwave absorption sensor, a density sensor, an ultrasound sensor, a resonant LCR sensor, and the like. Model predictive controls can be provided for the desalter system. The model predictive controls comprise data correlating the measured thickness of the emulsion band layer to a corrective chemical dosing rate and to a corrective delta P across the mixing device. Chemicals can be fed to the desalter at a chemical dosing rate to result in the emulsion band layer having a desired thickness.

The method may further comprise feeding the crude oil and the wash water to the desalter at the corrective delta P and/or feeding the chemicals to the desalter at the corrective dosing rate. In one aspect, the chemicals can comprise demulsifiers. The demulsifiers can comprise oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters, polyoxyalkylene glycols, and the like.

While this invention has been described in conjunction with the specific embodiments described above, it is evident that many alternatives, combinations, modifications and variations are apparent to those skilled in the art. Accordingly, the preferred embodiments of this invention, as set forth above are intended to be illustrative only, and not in a limiting sense. Various changes can be made without departing from the spirit and scope of this invention. Therefore, the technical scope of the present invention encompasses not only those embodiments described above, but also all that fall within the scope of the appended claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method of providing advisory controls for a desalter system, comprising:
    processing a crude oil blend in an oil refinery by mixing crude oil with wash water at a mixing device to form an emulsion, wherein the mixing device has one or more inlets and one or more outlets and wherein an adjustable pressure drop occurs from where the crude oil and wash water enters the mixing device through the one or more inlets to where the emulsion leaves the mixing device through the one or more outlets;
    desalting the emulsion utilizing a desalter system, wherein an emulsion band forms in a desalter vessel of the desalter system, said emulsion band positioned as a distinct layer between a water and crude oil interface in the desalter vessel of the desalter system;
    continuously monitoring, by a processor, performance of the desalter system as the desalter system is desalting the emulsion, wherein the continuous monitoring comprises receiving a plurality of inputs to the processor from the desalter system that are used by the processor to update a dynamic model of the desalter system;
    continuously monitoring, by a sensor in communication with the processor, a position, a quality and a thickness of the emulsion band in the desalter vessel of the desalter system as the desalter system is desalting the emulsion, wherein the position, quality and thickness of the emulsion band in the desalter vessel of the desalter system is provided to the dynamic model of the desalter system;
    controlling one or more of the position, the quality or the thickness of the emulsion band as the desalter system is desalting the emulsion based on the dynamic model of the desalter system; and
    providing recommendations for maintaining optimal pressure drop of the mixing device based on the dynamic model of the desalter system.

2. The method of claim 1, wherein chemicals are added to the desalter vessel of the desalter system to control one or more of the position, the quality or the thickness of the emulsion band.

3. The method of claim 2, further comprising determining a phase type of the emulsion, wherein the chemicals used to control one or more of the position, the quality or the thickness of the emulsion band and a dosing rate of the chemicals depends upon the phase type of the emulsion.

4. The method of claim 3, wherein in response to determining that the phase type of the emulsion is an oil continuous emulsion, then the chemicals include one or more of a primary emulsion breaker, a solids wetting agent, an asphaltene stabilizer, a pH adjusting agent, and combinations thereof.

5. The method of claim 3, wherein if the phase type of the emulsion is a water continuous emulsion, then the chemicals include one or more of a reverse emulsion breaker, a pH adjusting agent, and combinations thereof.

6. The method of claim 2, wherein the chemicals used to control one or more of the position, the quality or the thickness of the emulsion band are demulsifiers.

7. The method of claim 6, wherein the demulsifiers comprise one or more of oxyalkylated amines, alkylaryl sulfonic acid and salts thereof, oxyalkylated phenolic resins, polymeric amines, glycol resin esters, polyoxyalkylated glycol esters, fatty acid esters, oxyalkylated polyols, low molecular weight oxyalkylated resins, bisphenol glycol ethers and esters and polyoxyalkylene glycols.

8. The method of claim 7, further comprising determining an amount of emulsifiers to add to the desalter vessel of the desalter system to reach a point of inflection for the demulsifiers, said point of inflection comprising a point at which the monitored performance of the desalter system begins to decrease, and adding the determined amount of demulsifiers to the desalter vessel of the desalter system until the determined point of inflection is reached.

9. The method of claim 1, wherein the mixing device comprises a mix valve.

10. The method of claim 1, wherein the sensor is used to monitor position of the emulsion band, and the sensor is located either directly inside of the desalter vessel of the desalter system in a segmented configuration or is in-line with an existing sampling system of either tri-lines or a swing arm of the desalting system.

11. The method of claim 1, wherein the sensor is a conductance sensor.

12. The method of claim 1, wherein the sensor is a microwave absorption sensor.

13. The method of claim 1, wherein the sensor is a density sensor.

14. The method of claim 1, wherein the sensor is an ultrasound sensor.

15. The method of claim 1, wherein the sensor is a resonant LCR sensor.

16. The method of claim 1, wherein the dynamic model of the desalter system comprises a first principles based model executing on the processor to monitor performance of the desalter system.

17. The method of claim 16, wherein the plurality of inputs received by the processor include a geometry of the desalter system, physical properties of crude oil and wash water, and operating conditions of the desalter system.

18. The method of claim 17, wherein a Model Predictive Controls executing on the processor utilizes the first principles based model to control one or more of the position, the quality or the thickness of the emulsion band using chemicals.

19. The method of claim 18, wherein the processor further receives inputs comprising performance measurements of the desalter system including a flow rate for the wash water, crude oil properties, salt removal from the crude oil, water removal from the crude oil, and oil content in carryover brine and the Model Predictive Control utilizes the performance measurements of the desalter system, salt removal, water removal, and oil content of brine to adjust model parameters.

20. The method of claim 19, wherein the Model Predictive Controls doses the chemicals so that one or more of the position, the quality or the thickness of the sensed emulsion band is under control.

21. The method of claim 20, wherein providing recommendations for maintaining optimal pressure drop of the mixing device based on the monitored performance of the desalter system comprises the Model Predictive Controls providing the recommendations to users on effect of changing the adjustable pressure drop across the mixing device based on modeled performance of the desalter system.

22. The method of claim 21, wherein additional recommendations are provided to users based on an effect of variation in wash water flow rate, which is based on modeled performance of the desalter system.

* * * * *